E. A. YOUNG.
WELT OR RAND.
APPLICATION FILED APR. 5, 1921.
1,393,478.
Patented Oct. 11, 1921.
3 SHEETS—SHEET 1.
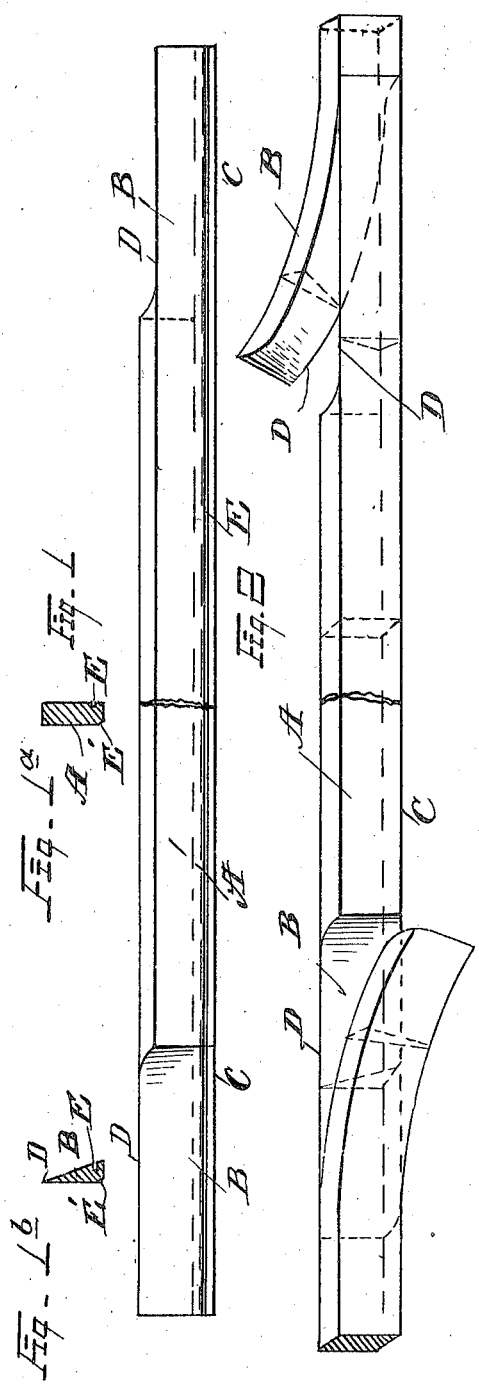
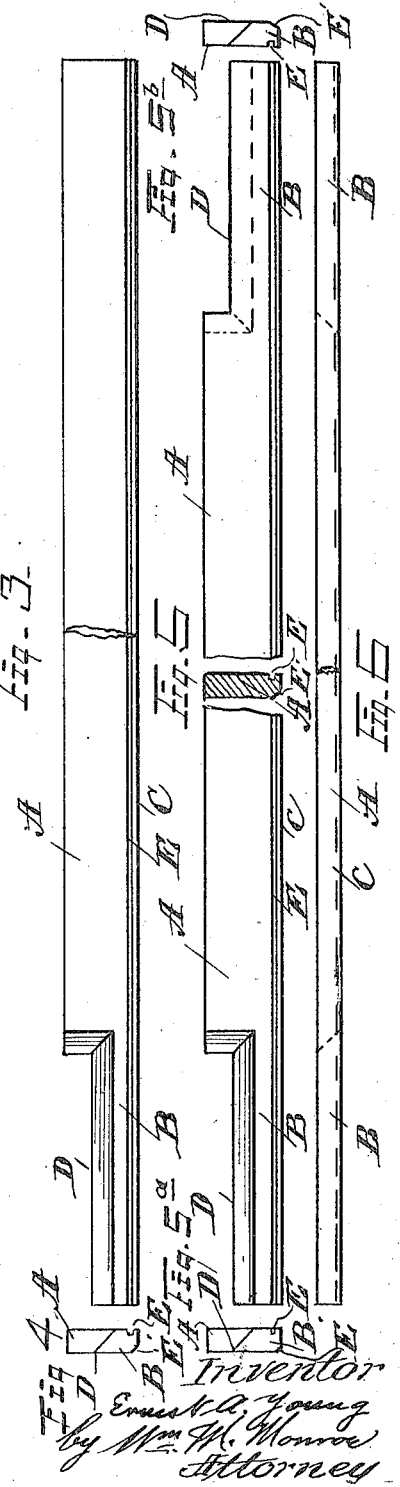

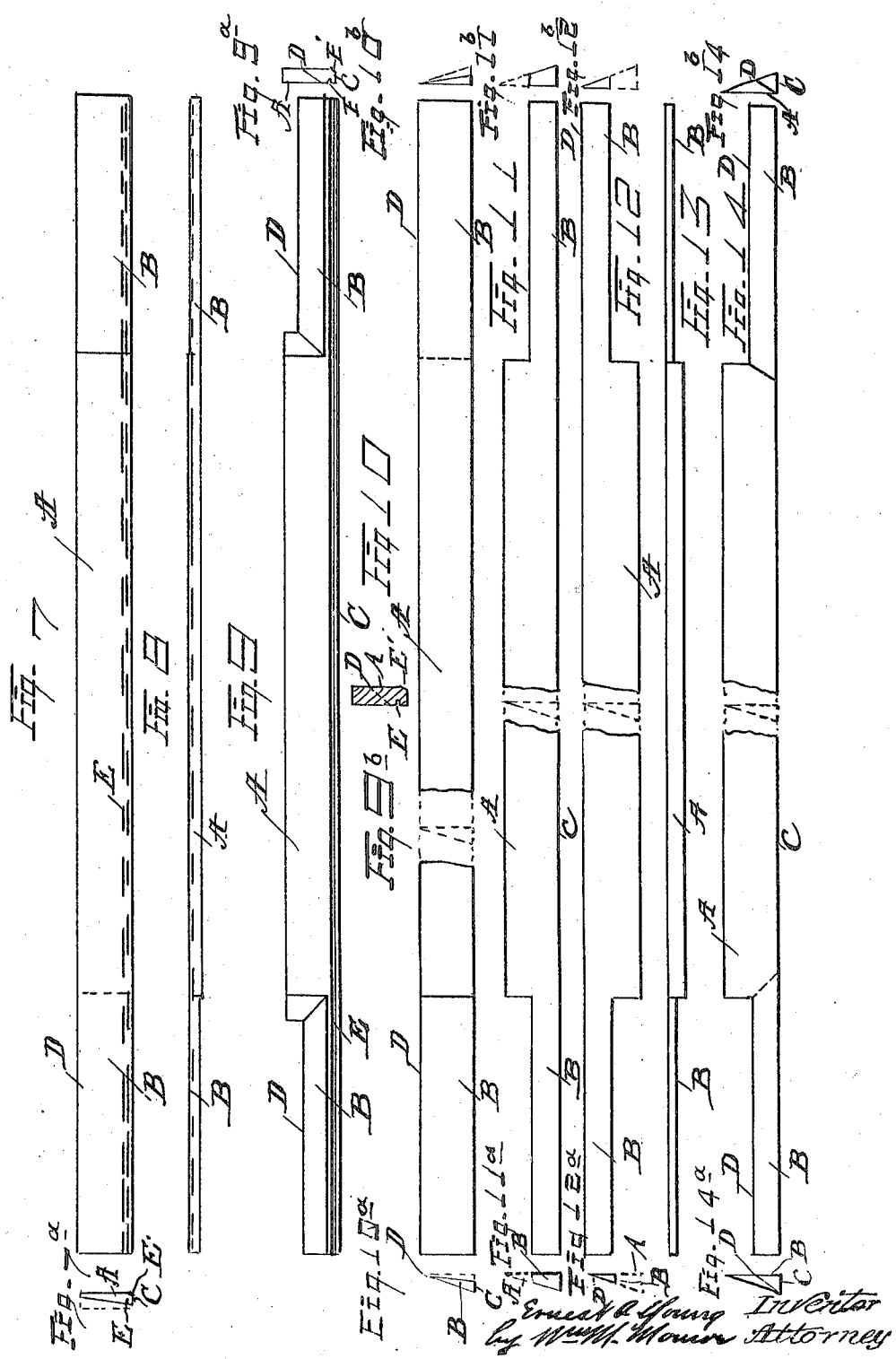

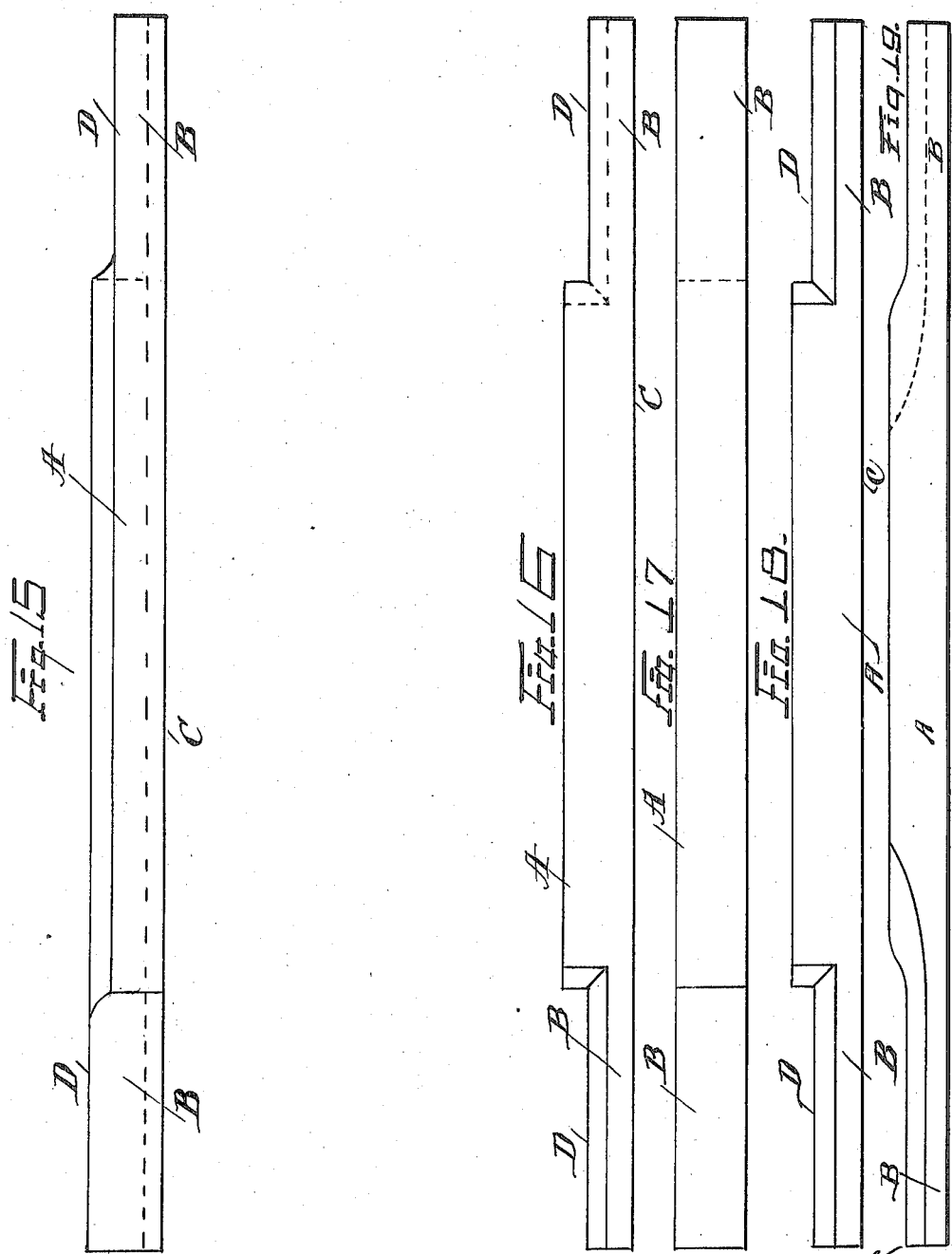

UNITED STATES PATENT OFFICE.

ERNEST A. YOUNG, OF CLEVELAND, OHIO.

WELT OR RAND.

1,393,478.         Specification of Letters Patent.     Patented Oct. 11, 1921.

Application filed April 5, 1921. Serial No. 458,672.

*To all whom it may concern:*

Be it known that I, ERNEST A. YOUNG, a citizen of the United States, and resident of Cleveland, in the county of Cuyahoga and State of Ohio, have invented certain new and useful Improvements in Welts or Rands, of which I hereby declare the following to be a full, clear, and exact description, such as will enable others skilled in the art to which it appertains to make and use the same.

The object of my invention is to provide an improved form of welt or rand which is capable of economical manufacture and use.

Welts are now cut off immediately after the welt is sewn to the insole and upper of a shoe, and then cut off a second time, forming scrap or waste material. My types of individual welts or rands avoid waste of that character.

They also permit the saving of several operations now done by processes in general use, such as the cutting off of the welt by the welt sewer, and afterward cutting off the projecting extremities, which is known as "butting the welt."

Another object attained is that the welts by being cut to predetermined length for each shoe to which they are to be fastened, produce no scrap or waste material.

It includes cutting welts at intervals into predetermined lengths for the particular shoes to which they are to be attached, the strips thus separated having complementary projecting or overhanging shank portions, the newly exposed faces thereof as compared with the original body faces being laterally and longitudinally inclined to the upper and lower faces of the body portion of said welts, and also saving in the overlapping parts of the original strip an amount of material equal to the amount of the longitudinal and lateral overhang or overlap thereof.

Another object is to produce an individual welt having longitudinally and transversely diminished extremities, with feathered outside edges adapted to extend over both sides of the shank portion of the sole of a shoe. These edges present very little added thickness to the sole after the welt is fastened in place, since the feather edge is very thin and nearly disappears from view a little inside of the edges of the shank portion of the sole, and the joint between the welt and the sole is almost invisible. This feature is desirable in the manufacture of very fine shoes.

Another important feature of my invention is found in constructing the welt with elongated longitudinally and laterally diminished extremities which are to be applied along the shank portion of a shoe and in the preferred forms making the inner edge of the body and extremities of the welt of substantially uniform thickness throughout. This is important, since the stitch-receiving groove is located adjacent to the inner edge and it is important that the welt should not be weakened at that point.

Another valuable advantage can be obtained from the use of individual welts or rands of this character, since if in applying them to a shoe a cemented joint should coincide with the curve of the toe of said shoe, the welt or rand can be re-cut so that two welts or rands are formed, and the cemented joint will then not come at the curve of the toe of the shoe, neither will any scrap be produced. Also, if the preferred form is employed, the linear and lateral extent of the two new welts thus formed will be increased by the amount of overhang produced.

Furthermore, in the preferred form, the improved welt or rand is so constructed that it will have elongated, laterally and longitudinally diminished overhanging extremities, integral with the body portion.

The body portion of the welt or rand is thus adapted to be fastened around the forepart of a shoe for substantially the entire length of said forepart, and the extremities are adapted to be fastened for the greater part of the length of the newly exposed faces, formed by cutting, to the shank portion of a shoe, on each side thereof.

In the preferred form, the newly exposed face at one end takes a longitudinal and lateral direction, commencing at and coinciding with the original upper face of said welt, and coinciding with and traversing the transverse obliquely inclined plane of said welt for substantially the entire length of said shank portion of said welt, and terminating in the bottom face of the body portion of the welt, also said body portion of said welt is provided with another newly exposed face at the opposite end, in that part of the welt that is adapted to be fastened for the greater part of the length of said face to the other side of the shank portion of a shoe and which adjoins the body portion of the welt and is integral with it, and in the preferred form, this second newly exposed face takes a longitudinal and lateral direction commencing at and coinciding with the original bottom face of said welt, then meeting and coinciding with and becoming the transverse obliquely inclined plane of said welt, then traversing substantially the entire length of the shank portion of said welt, along the said transverse obliquely inclined plane, and ending by meeting and coinciding with the upper face of said welt. Also in the preferred form the newly exposed faces extend in substantially the same longitudinal direction but upon different obliquely inclined planes of the cross section of the welt.

Also, each welt is preferably supplied, after it has been detached from the original welt, with a stitch-receiving groove, formed upon the lower face adjacent to the inner edge. This groove traverses the freshly exposed face of the diminished, sloping and projecting portion at one extremity, and the original lower face of the body portion, and at the other extremity of the welt the groove traverses the original face of the diminished projecting shank portion, if both ends of the welt are diminished, sloping and projecting as shown in the preferred form. If only one extremity of the welt is diminished, sloping and projecting as shown in the preferred form the groove traverses the body portion on its original face, and on the extremity it follows the original bottom face of the welt. The continuous inner, upper corner of the body portion and of the diminished shank portion is also beveled.

All of the forms of welt shown and described are adapted to be cut from a continuous welting strip without waste, and each has at least one of the following characteristics; either it has a groove extending along the body and an original surface of a diminished end extension, or else two of the faces of the finished welt show equal areas of their original uncut surfaces.

Also, among modifications of the device, are included an individual welt or rand having a body portion adapted to be fastened around the forepart of the shoe, and having a laterally and longitudinally diminished end portion, said diminished end portion adapted to be fastened along the shank portion of the said shoe. The other end of the body portion is adapted to be fastened to the opposite side of the shank portion of the said shoe.

In case the individual welt or rand is fastened to a stitched down shoe above the upper, and that type of individual welt or rand is used that has only one reduced or diminished overhanging, sloping shank portion, a convenient place to have the reduced shank portion extremity and body portion extremity meet, would be at the shank portion of the shoe, although I do not limit myself to that position.

In case the individual welt or rand having both reduced or diminished, overhanging, sloping shank portions is used in a stitched down shoe above the upper, a convenient place to have the extremities meet would be at the back of the shoe, although I do not limit myself to that position.

Another object attained, in the preferred form where a leather welt or rand is used that has the grain side of the leather for a top face and the flesh side of the leather for a bottom face, is, that the shank portions of said individual welt or rand obviously have the grain side of the leather on the top face of one overhanging shank portion, and have the newly cut face of the leather upon the top face of the other overhanging shank portion, and in fastening said individual welt or rand to a shoe the shank portion of the individual welt or rand having the cut side exposed upon its top face is preferably fastened to the inner edge of the shank portion of the sole of a shoe. The inner edge of the shank portion of the sole and welt or rand is then trimmed very close so that almost all of the said shank portion of said welt or rand, that would otherwise be seen, is trimmed away, leaving an extremely small amount of projection of said welt or rand in the said shank portion of a shoe at said inner edge, so that very little of the rough flesh side of the leather on the top face of said shank portion of said welt or rand is exposed to view.

The invention is exemplified in the accompanying drawings, hereinafter further described and specifically pointed out in the claims.

In the accompanying drawings, Figure 1 is, a perspective of the preferred form of welt, showing the out faces of the extremities running in the same general longitudinal direction but upon reversed obliquely inclined planes of the cross section of the welt. In this figure the extremities retain throughout substantially their entire length the same thickness at the inner edge as that of the body portion at the inner edge. Fig. 1ᵃ is a transverse section of the body portion and Fig. 1ᵇ is a transverse section of the left extremity. Fig. 2 is a similar view, showing the method of producing the welt shown in Fig. 1 from an elongated welting strip, and showing cross section in dotted lines. Fig. 3 is a plan view of a welt having only one shank portion diminished, thus saving only one-half the amount of material that is saved by the type of welt shown in Figs. 1 and 2; Fig. 4 is an end elevation thereof; Fig. 5 is a plan of a similar welt in which both shank portions are diminished, and the outer edge of the shank portion is completely cut away, thus lightening the appearance of the edges of the shank of a shoe, since the joint will be nearly invisible on either side of the shank and the outer edge of the shank portion of the welt will be nearly invisible. The extremities are cut in the same direction; Figs. 5ª and 5ᵇ are end elevations thereof; Fig. 6 is an edge view thereof; Fig. 7 is a plan of an individual welt, showing the freshly cut faces running longitudinally in the same direction, and at an oblique angle to the top and bottom faces of the welt but not in the diagonal plane thereof; Fig. 7ª is an end elevation thereof; Fig. 8 is an edge view thereof; Fig. 9 is a plan of a welt showing the shank portions diminished in opposite directions, and showing the feathered outer edges spaced inwardly from the outer edge. Fig. 9ª is an end elevation of Fig. 9; Fig. 9ᵇ is a transverse section of the body portion of the welt.

Fig. 10 is a plan of an individual rand having an elongated body portion provided with flat faces and parallel edges, and having integral projecting longitudinally reduced shank portions, adapted to extend substantially over the entire length of the shank portion of the shoe. The cross section of the body of the rand is a right triangle, and that of one shank portion is a right triangle, and the cross section of the other shank portion is an oblique triangle. The freshly exposed sloping faces run in the same longitudinal direction; Figs. 10ª and 10ᵇ are end elevations thereof; Fig. 11 shows a rand having the cross section of both extremities trapezoidal; Figs. 11ª and 11ᵇ are end elevations of projecting extremities thereof; Fig. 12 shows the rand cut from the original strip alternately with the rand shown in Fig. 11; Figs. 12ª and 12ᵇ show elevations of the extremities thereof; Fig. 13 is an edge view thereof; Fig. 14 represents a rand in which the cross section of the body is a right triangle and the cross section of one extremity is also a right triangle and a cross section of the other extremity is an oblique triangle; Figs. 14ª and 14ᵇ are elevations of the extremities; Figs. 15, 16, 17, and 18, are welts corresponding to the welts shown in Figs. 1, 5, 7 and 9 respectively, before the grooves and bevels have been applied thereto which could be used as rands. Fig. 19 is a plan of a welt or rand of the types shown in Figs. 5, 9, 16 and 17, showing the abrupt corners rounded off which can be done either before or after the device is fastened to the shoe.

In these views A is the body portion, preferably having parallel sides and edges, and B, B, are the longitudinally and laterally diminished extremities, which overlap in the original welt and project when the parts are separated into individual welts or rands.

These extremities in the preferred form of welts present one edge, C, undiminished in thickness throughout substantially the entire length of the welt. The edge D, as shown in Figs. 1, 2, 3, 5, 9, 10, 14, 15, 16, and 18, is diminished in thickness, or "feathered" at the shank portion of the welt and is applicable to substantially the entire length of the shank portion of the shoe on both sides thereof. E is the stitch-receiving groove which traverses the bottom face adjacent to the inner edge of the welt and may traverse the original surface, as shown in Figs. 3, 5, 6, and 9, or may, as in the preferred form shown in Fig. 1 traverse the freshly cut surface of one extremity. Also the upper inner corner of the welt is beveled at E', as shown in Figs. 1ᵇ, 4, 5ª, 7ª and 9ª, and in the preferred form traverses one reduced shank portion upon the newly exposed face, and upon the body portion the original face, and upon the opposite reduced shank portion said bevel traverses the original face.

The overlapping extremities of the welts or rands are separated from each other in all the specific forms by means of longitudinal cuts, in planes taken at an oblique lateral angle to the upper and lower faces of the welt or rand, except the types shown in Figs. 11, 12, 13.

In the preferred form shown in Fig. 1, the feathered edge corresponds with the extreme outer edge of the welt. In Figs 3, 5, and 9 the outer edges of the extremities of the welts are withdrawn so far that they will be nearly invisible at the edges of the shank portion of the finished shoe.

The original thickness of the inner edge is retained in Figs. 1, 2, 3, 5, 6, and 9, but in Fig. 12 is shown a rand which alternates with the rand shown in Fig. 11, and hence the outer edge is shown cut away at the extremities.

The direction of cutting is shown in Figs. 1 and 2 to be the same at both extremities, but taken upon reversed obliquely inclined planes. These figures show the preferred form of welt, previously described in detail.

I am aware that welting has been made with one edge reduced in thickness along its entire length, but that form of welting is weakened to the extent of the amount of material removed, but in my invention, in the preferred form, there is no weakening of the stitch receiving portion to any greater extent than is caused by processes now generally in use, neither is the welt reduced in thickness along substantially its entire length at its inner edge, as has been previously done in some cases.

In Figs. 9 and 18 the direction of cutting the inclined surfaces of the overhanging extremities is shown to be in opposite directions. This modification may be employed if more convenient in cutting the material, and other modifications may be employed within the scope of the claims.

It is obvious that the welting strips can be used as welts without the addition of the groove and bevel, but it is not now generally the practice to do so. For instance, in Figs. 15, 16, 17, and 18, welts without grooves or beveled corners are shown which are adapted to be used as rands. Otherwise these figures are similar to Figs. 1, 5, 7, and 9, leaving out the groove and beveled corner. All of these individual welts that have overhanging, sloping faces on the reduced or diminished shank portion, at an oblique angle to the top and bottom faces of the body portion of said welt, retain the original thickness at the inner edge of both shank portions and the body portion, except the ones shown in Figs. 7 and 8. In the individual rand of the type shown in Figs. 10 and 12, the reduced or diminished shank portions at the outer edge are reduced in thickness, but in an individual rand where the freshly exposed face is at an angle to the top and bottom faces of the said body portion, as shown in Fig. 14 the thick edge of the shank portions at their outer edges of the individual rand will have the original thickness of the blank from which it was formed, but the outer edge of the shank portion that is removed, will not have it.

In the types of welts or rands shown in Figs. 3, 5, 9, 11, 12, 14, 16 and 18, the corners that are shown at the point where the reduced shank portions adjoin the body portions are finally trimmed off to conform to the shape of the sole of the shoe at this point. The corners may be trimmed off before the welts or rands are fastened to the shoe or afterward.

In all longitudinal views the side of the welt that is to form the inside edge is shown downward and the face that is to be the bottom of the welt is shown toward the observer.

It will be noted that in all the forms shown both body portion and end portions are of technical prismatic formation; that is, they have a uniform polygonal cross section, and do not taper, though in some forms, as in the preferred one, the end portions are joined to the body portion by tapering merging portions.

Having described my invention, what I claim as new and desire to secure by Letters Patent, is:

1. A strip of welting comprising a prismatic body portion and reduced substantially prismatic end portions extending from the body portions, the two ends being projections of different parts of the cross-section of the body portion.

2. An individual welt or rand comprising, an elongated body portion having flat faces and parallel edges, said body portion diminished at its outer ends, forming overhanging shank portions longitudinally and transversely reduced and having their freshly cut or exposed faces lying at an oblique lateral angle to the top and bottom faces of said body portion, the said freshly cut faces running in the same general longitudinal direction in both extremities but included in reversed lateral obliquely inclined planes.

3. A strip of welting comprising a prismatic body portion and reduced substantially prismatic end portions, the original surfaces left uncut by the reduction of the end portions being equal on two faces of the strip.

4. A strip of welting comprising a prismatic body portion and a reduced prismatic end portion, a stitch receiving groove running along the bottom of the strip adjacent the inner edge and extending along a surface of the end portion uncut in reducing the cross-section of said end portion.

5. A strip of welting comprising a body portion and reduced end portions, each end portion having for the major portion of its length substantially one half the cross section of the body portion, the under face of one extension being a projection of the under face of the body portion and the top face of the other projection being a projection of the top face of the body portion.

6. A strip of welting comprising a body portion of substantially uniform cross-section and a reduced extremity on the end of the body portion having a substantially uniform cross-section, one surface of the extremity being a projection of the corresponding surface of the body portion, and a groove running along said surface over both the body portion and extremity.

7. A strip of welting comprising a body portion consisting of a rectangular prism, a reduced extremity consisting of a triangular prism of which two adjoining surfaces are extensions of body surfaces, and a stitch receiving groove running along both the body and extremity adjacent the juncture of said surfaces.

8. A strip of welting comprising a prismatic body portion and reduced substantially prismatic end portions connected to the body by beveled merging portions, the original surfaces left uncut by the reduction of the end portions being equal on two faces of the strip.

9. A strip of welting comprising a body portion having parallel faces and parallel sides and reduced end portions formed by cutting away the under face and the entire outer side at one end and the upper face and the entire outer side at the other end.

10. A welt comprising, an elongated body portion, having flat faces and parallel edges, and elongated longitudinally and transversely reduced extremities, said extremities having freshly exposed oblique faces, the body portion of said welt adapted to be attached to the forepart of a shoe, and the said reduced extremities adapted to be attached to and extend over the shank portion thereof, said oblique face commencing at and coinciding with the original upper face, then meeting the bottom face of said welt, and then traversing and coinciding with the transverse obliquely inclined plane of said welt, in the said shank portion of said welt, and finally meeting and coinciding with the bottom face of said welt, and a stitch receiving groove being formed along the bottom face, adjacent to the inner edge, upon the original face of the body portion and one reduced shank portion, said groove being continued along the freshly cut face of the other reduced shank portion.

11. A leather welt or rand comprising, a body portion and reduced extremities, said reduced extremities forming shank portions, said shank portions being of uniform cross section for the major part of their lengths, one reduced shank portion thereof having the freshly cut side for the top face thereof, and the other reduced shank portion having the grain side for its top face, one of said reduced shank portions adapted to be fastened along the edge of the shank portion of a shoe so that the freshly cut side will become the top face of the said shank portion, and the other of said shank portions adapted to be fastened along the other edge of the shank portion of the shoe and having the grain side for its top face, both of said reduced shank portions being adapted to be trimmed away at their outer edges, said body adapted to be fastened around the forepart of the said shoe.

12. A strip of welting comprising a body portion consisting of a rectangular prism, end portions consisting of right triangular prisms, and merging portions connecting the rectangular body with the triangular ends, one narrow face of the body being extended to form one face of both ends, the opposite narrow face being cut away at both ends, and each broad face being extended at one end only, and there being a stitching groove running along one broad face the full length of the strip adjacent the narrow face which is extended at both ends.

In testimony whereof I hereunto set my hand this 4th day of April, 1921.

ERNEST A. YOUNG.

In presence of—
CHAS. C. GOLDMAN,
WM. M. MONROE.